No. 737,246. PATENTED AUG. 25, 1903.
E. A. JOHNSTON.
CORD HOLDER FOR GRAIN BINDERS.
APPLICATION FILED SEPT. 29, 1902.
NO MODEL. 6 SHEETS—SHEET 1.
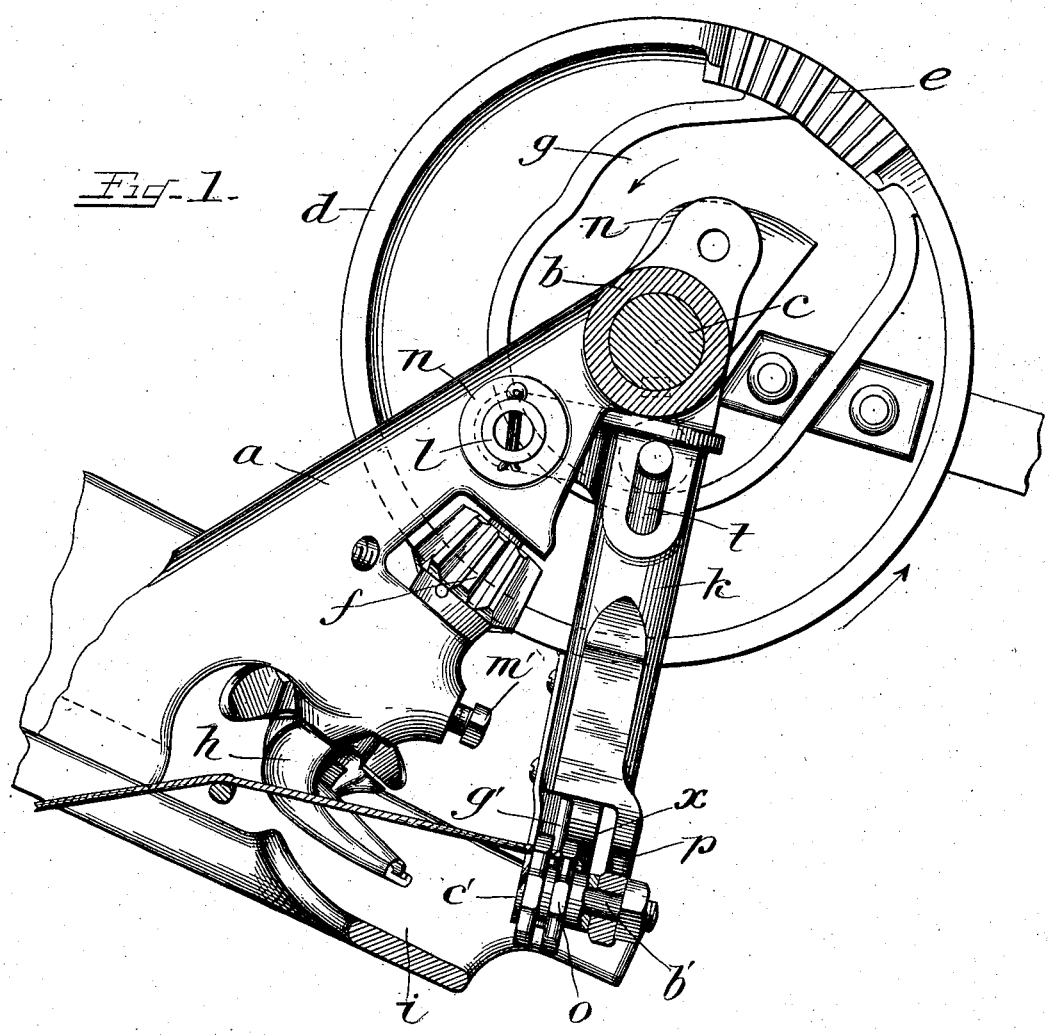

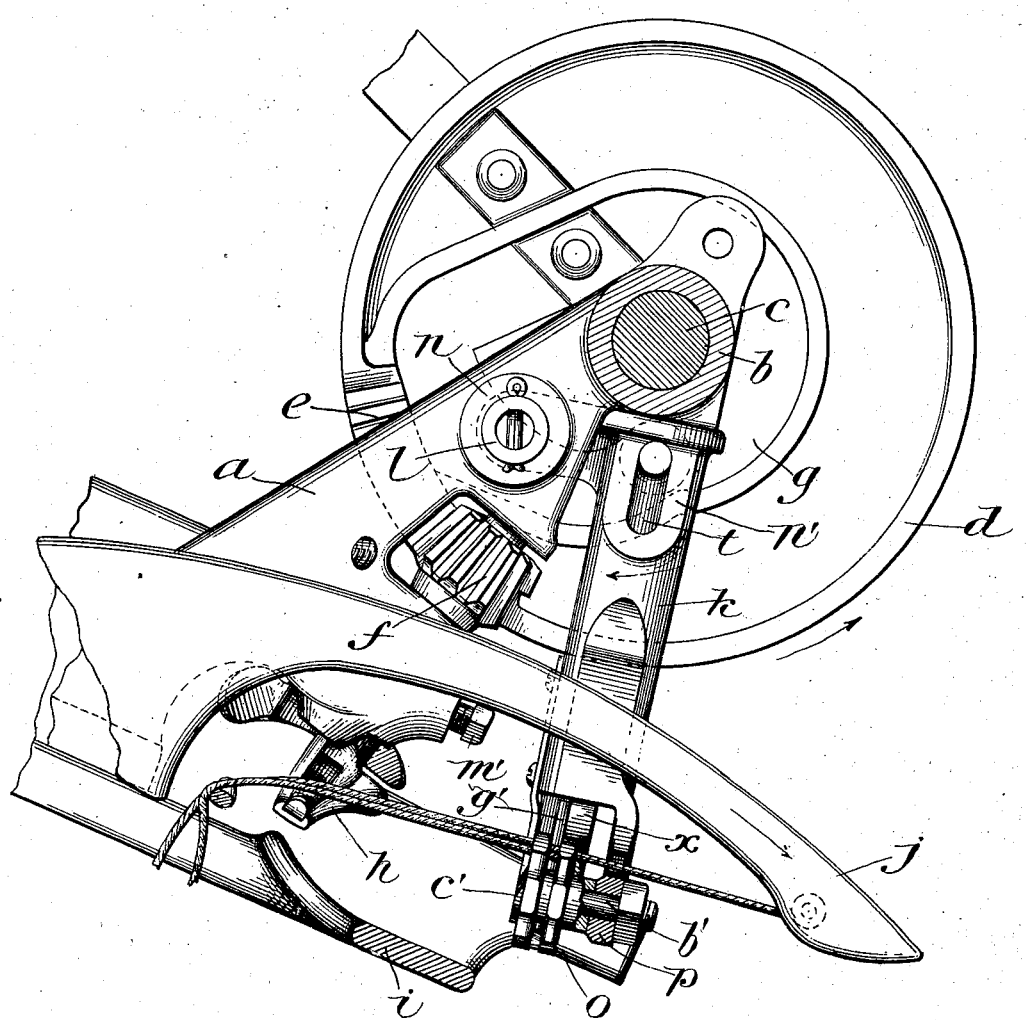

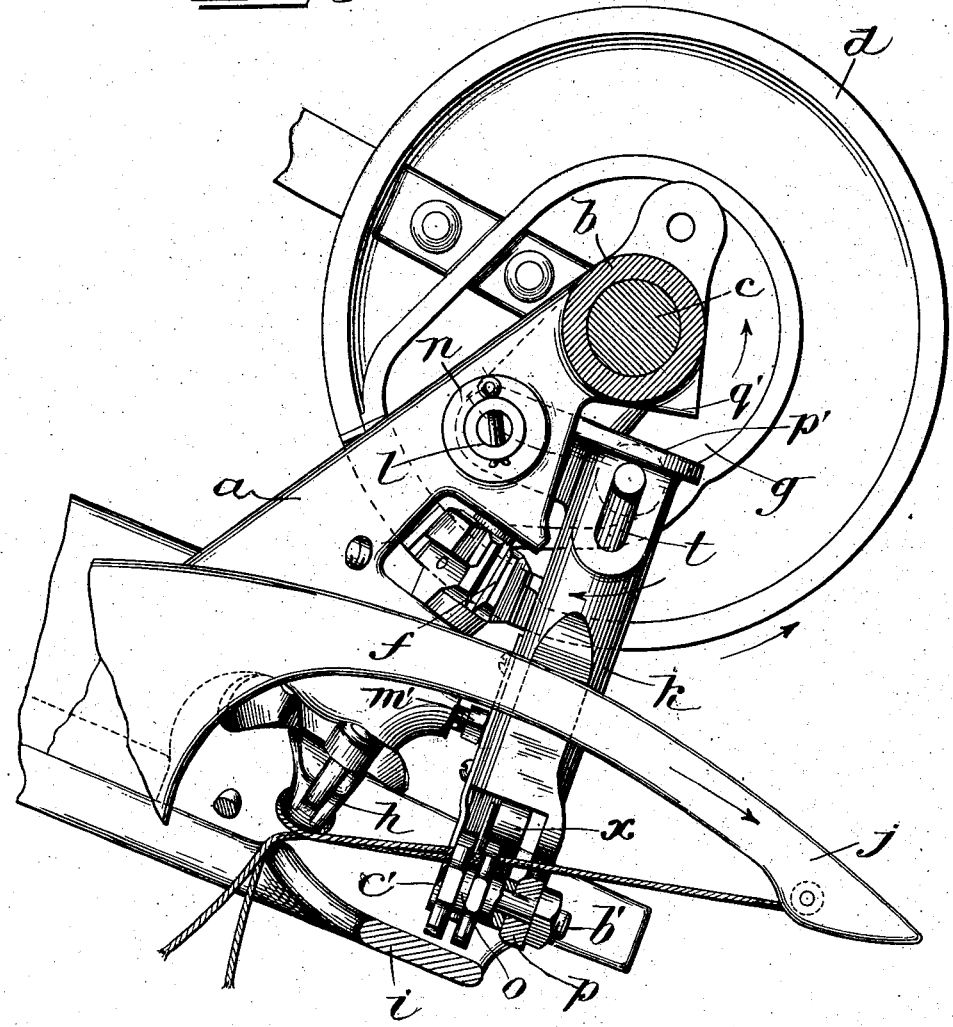

No. 737,246. PATENTED AUG. 25, 1903.
E. A. JOHNSTON.
CORD HOLDER FOR GRAIN BINDERS.
APPLICATION FILED SEPT. 29, 1902.
NO MODEL. 6 SHEETS—SHEET 4.
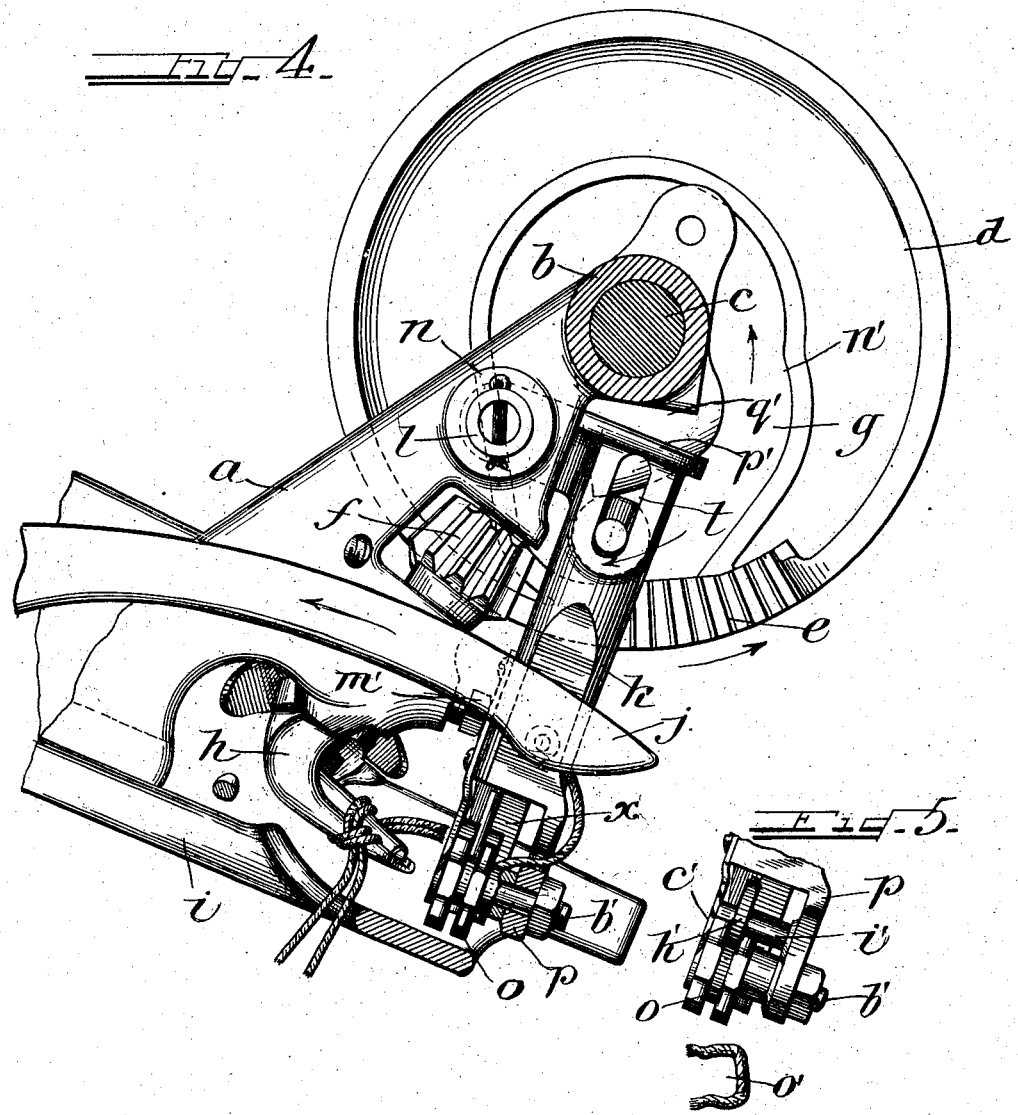

No. 737,246. PATENTED AUG. 25, 1903.
E. A. JOHNSTON.
CORD HOLDER FOR GRAIN BINDERS.
APPLICATION FILED SEPT. 29, 1902.
NO MODEL. 6 SHEETS—SHEET 5.
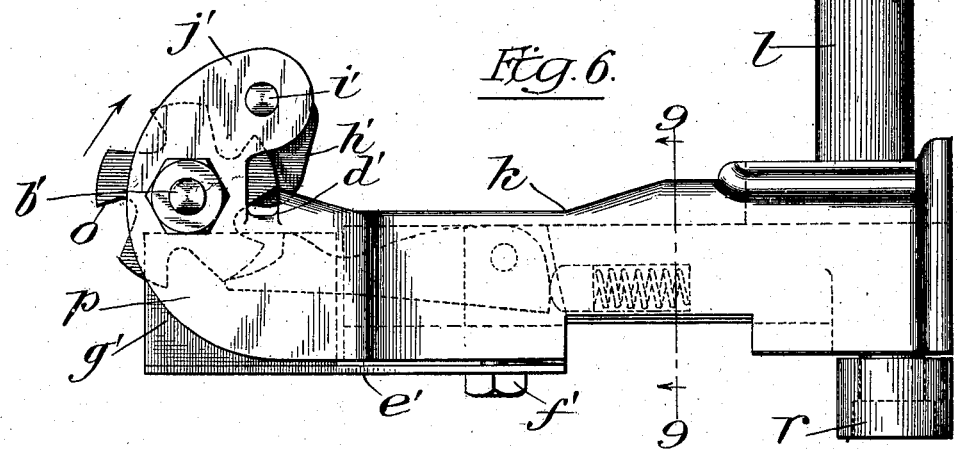
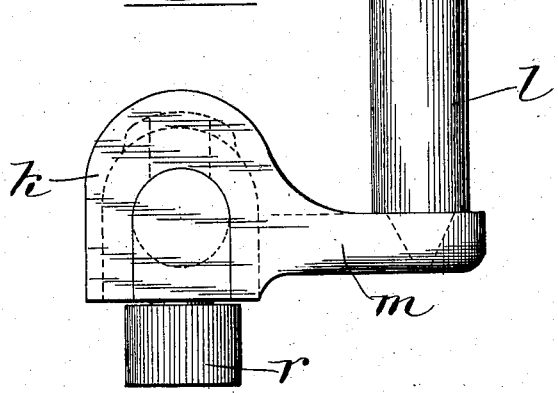
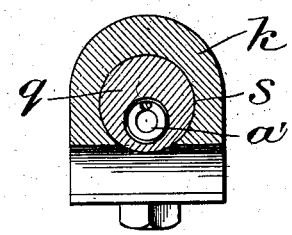
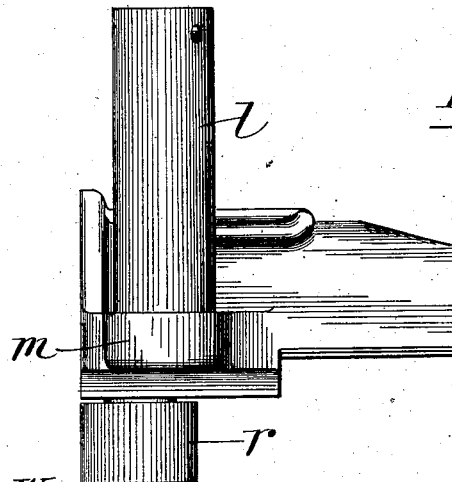
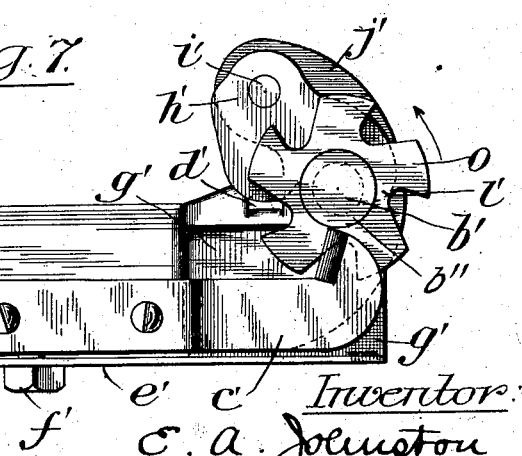
Witnesses:—
Richard L. Crut.
D. W. Edelin.
Inventor:—
E. A. Johnston
By his attys.
Rennie & Goldsborough No. 737,246. PATENTED AUG. 25, 1903.
E. A. JOHNSTON.
CORD HOLDER FOR GRAIN BINDERS.
APPLICATION FILED SEPT. 29, 1902.
NO MODEL. 6 SHEETS—SHEET 6.
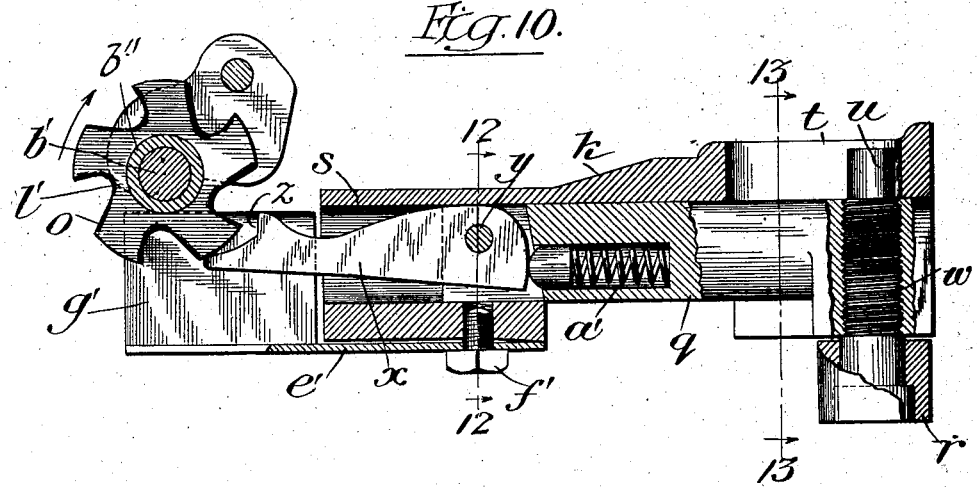
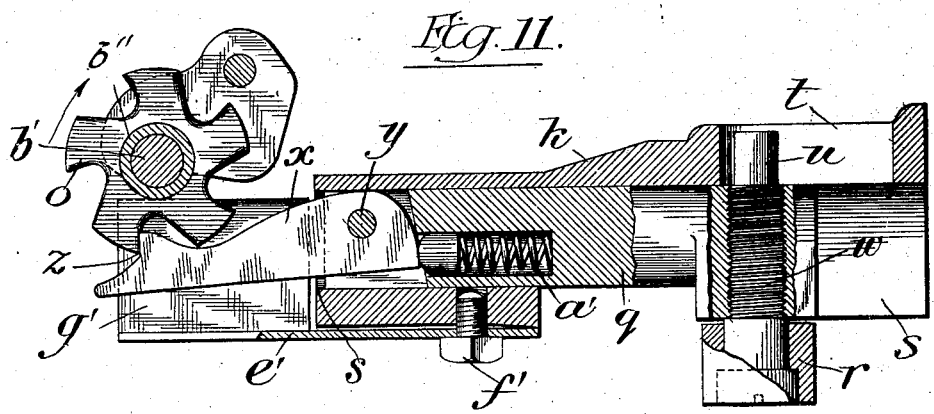
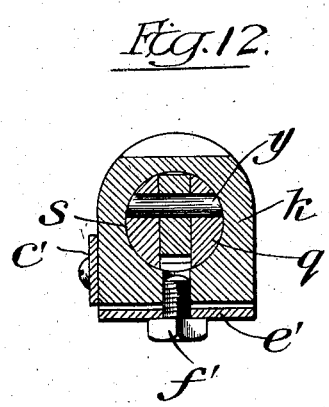 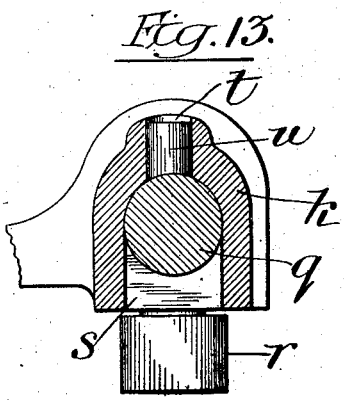
Witnesses:-
Richard C. Orwit.
D. W. Edelin.
Inventor:-
E. A. Johnston
By his attys.
Rennie & Goldsborough.

No. 737,246.

Patented August 25, 1903.

UNITED STATES PATENT OFFICE.

EDWARD A. JOHNSTON, OF CHICAGO, ILLINOIS, ASSIGNOR TO INTERNATIONAL HARVESTER COMPANY, OF CHICAGO, ILLINOIS, A CORPORATION OF NEW JERSEY.

CORD-HOLDER FOR GRAIN-BINDERS.

SPECIFICATION forming part of Letters Patent No. 737,246, dated August 25, 1903.

Application filed September 29, 1902. Serial No. 125,184. (No model.)

*To all whom it may concern:*

Be it known that I, EDWARD A. JOHNSTON, a citizen of the United States, residing at Chicago, county of Cook, State of Illinois, have invented certain new and useful Improvements in Cord-Holders for Grain-Binders; and I do hereby declare the following to be a full, clear, and exact description of the invention, such as will enable others skilled in the art to which it appertains to make and use the same.

The object of the invention is to provide a holder which will yield up to the knotter a definite amount of cord or twine as required in the formation of the loop instead of requiring the knotter to pull out the twine through the holder, as is required in many knotters of the present day.

Holders which yield up slack to the knotters by moving bodily toward them at the proper time have advantages over the kind where the slack is pulled through by the knotter. Principal among these are that while the band is always held tightly around the bundle, as usual, the adjustment of the holder-spring does not interfere in any way with the successful operation of the knotter and that cords of different sizes may be successfully held in the same holder. These advantages are all inherent in the present invention, together with the additional advantage, among others, that a single cam on the knotter-operating wheel serves to permit the holder to swing up to the knotter and also operates the means by which the holder-disk is actuated.

The invention is illustrated in the accompanying drawings, wherein—

Figure 1 represents a front elevation of a knotter provided with a swinging cord-holder, showing the holder-strand held in the cord-holder and the parts being in the position which they maintain during the formation of the bundle. Fig. 2 is a front elevation of the same parts shown in Fig. 1, showing the needle-strand carried forward by the needle and laid into the cord-holder preparatory to being engaged by the disk and the forming of the knot. Fig. 3 is a front elevation of the parts shown in Fig. 2, showing the cord-holder swung up to the knotter-hook, thus yielding the required amount of twine to the knotter-hook. Fig. 4 is a front elevation of the parts shown in Figs. 2 and 3 at the completion of the knot, showing the plunger of the cord-holder moved down to its lowest position by means of the cam of the tier-wheel, which movement serves to turn the disk to engage the needle-strand, at the same time severing the two strands to permit of the discharge of the bundle. Fig. 5 is a fragmentary view of the cord-holder, showing the cleaner, which is located between the two members of the cord-holding disk and held in position by means of a stud which is secured to a portion of the cord-holder frame. Fig. 6 is a side elevation of the cord-holder, showing the side farthest from the knotter-hook. Fig. 7 is a side elevation of a cord-holder, showing the opposite side from that shown in Fig. 6. Fig. 8 is a plan view of the cord-holder, showing the relative position of the trunnion on which it is pivoted and the antifriction-roller of the plunger. Fig. 9 is a sectional view taken on the line 9 9 of Fig. 6. Fig. 10 is a partial sectional view taken on a plane passing through the axis of the plunger and parallel to the axis of the trunnion, showing the plunger and the cord-holding disk in their normal position. Fig. 11 is the same as Fig. 10, showing the plunger moved to its lowest position, thereby turning the cord-holding disk to engage the needle-strand and at the same time to sever the two cords to permit the discharge of the bundle. Fig. 12 is a sectional view on the line 12 12 of Fig. 10. Fig. 13 is a sectional view on the line 13 13 of Fig. 10.

Referring first to Figs. 1, 2, 3, and 4, *a* denotes the knotter-frame, and *b* the hub of the same, which is journaled on the knotter-operating shaft *c*, which in turn is journaled in the overhanging tubular arm of the binder-frame. On the end of this shaft, as usual, is secured the knotter-operating cam and gear-wheel *d*, which is provided with the customary gear-segment *e* for driving the knotter-pinion *f* and with a cam-groove *g*, which constitutes one of the important features of the present invention and will be more fully described later on.

The construction of the knotter-frame $a$ presents no particular novelty, and the knotter itself $h$ may be of the ordinary or any preferred type. As here shown, the knotter is of the kind that makes but one revolution to complete the knot and is left with its jaws pointing outward in the general direction of the outgoing bundle. The knotter-frame $a$ is secured to the ordinary breastplate in any suitable manner, and the needle $j$ is constructed and operated in the usual way.

The cord-holder is of the notched-disk type and comprises a bell-crank-shaped frame $k$, which is pivoted, by means of an integral trunnion $l$ at the end of its short arm $m$, to the knotter-frame $a$ in a bearing $n$, that is located slightly below and inward from the knotter-operating shaft $c$. The long arm of the cord-holder frame has the holding-disk $o$, journaled on a transverse pin in an extension $p$, projecting beyond the end of the arm at one side, as clearly shown in all the figures, and the disk is operated by a plunger $q$, that slides longitudinally in the holder-frame and has a roller $r$ at its upper end, which projects laterally into the cam-groove $g$ of the knotter-operating wheel. The long arm of the holder-frame, which carries the plunger and holding-disk, is bored out, as shown at $s$, to receive the plunger, and at its upper end the arm is also provided with a slot $t$ opposite where the roller $r$ on the plunger projects, and into the slot extends a pin $u$ to guide the plunger in its movements and prevent it from turning in the bore of the holder-arm. The pin $u$ is preferably the extended end of a threaded stud $w$, that is screwed into an interiorly-threaded socket at the upper end of the plunger and carries the roller $r$ at its other end.

At its lower end the plunger carries a pawl $x$, that is pivoted to it at $y$ and projects beyond the end of the bore in the holder-frame and into operative proximity to the holder-disk, where it is provided with a shoulder $z$, which engages the notches of the disk on the forward throw of the plunger. Between the pivot $y$ of the latch and the end of the plunger there is a spring $a'$, that is seated in a hole in the plunger and presses on the heel of the pawl, so as to cause its front end to engage the notches of the disk when the plunger moves forward, but allows it to yield and the shoulder $z$ to slip past the notches when the plunger returns.

The holder is of the twin-disk type—that is to say, it consists of two disks exactly alike, journaled on the same stud $b'$, with a narrow intervening space between them. The stud is bolted into the extension $p$ of the holder-frame, so that the disk stands transversely to the plane in which the holder-frame swings, and the location of the extension $p$ at one side of the holder-frame brings the edge of the disk to the center of the frame and into line with the movement of the plunger. At the opposite side of the holder-disk from the extension $p$ there is secured to the holder-frame a knife or cord-cutter $c'$ of the usual kind. The extension of the holder-frame is notched, as shown at $d'$ in Figs. 6 and 7, to receive the cord laid by the needle and prevent its accidental escape from the notches of the disk. The cutting edge of the knife is located at a point a little farther on in the rotation of the disk, as best shown in Fig. 7, so that the cords will not be cut until the disk has secured a firm grip on them.

The cords are held in the notches of the holder-disk by means of a spring $e'$, that is adjustably secured to the holder-frame by a tension-screw $f'$. This spring is secured against one side of the holder-frame and has a flange $g'$, that is set edgewise on it and projects into the space between the two disks of the holder, so that the cords are forced into the notches by the spring and securely held there by the pressure of the spring and the friction caused by the interlocking holding-surfaces.

In order to strip the fag ends of the cord left in the holder by the knife, I provide a cleaner $h'$, which consists of a metal plate of irregular shape that is secured to the outer end of a pin $i'$, that is riveted or tapped into an extension $j'$ of the arm $p$ of the holder-frame. This extension is simply a continuation of the arm $p$ past the holder-disk into such position that when the cleaner-plate $h'$ is secured to it it will project toward the axis of the disk, as best indicated in Figs. 5, 6, and 7, where it will be seen that the upper edge of the cleaner is inclined, so as to direct the cord toward and into the notch $d'$ of the holder-frame, and that its end or point extends into close proximity to and partly surrounds the hub of the holder-disks, which hub is journaled on the stud $b'$, on which the holder-disks revolve. The arrow indicates the direction of rotation of the disk, and it will be understood from the above description, taken in connection with the illustration, that any fag ends or bits of cord that get caught in the disk will be pushed out and the disk stripped clean by the point $l'$ (see Figs. 7 and 10) of the cleaner, which is preferably in actual contact with the hub $b''$ of the disk and lies between the twin members thereof, as best shown in Fig. 5.

In Figs. 1 to 4, $m'$ denotes a set-screw which is tapped into the knotter-frame in a position to be struck by the holder-frame when it swings inwardly toward the knotter. This screw is adjustable in a way that will be readily understood and forms an adjustable stop to limit the inward movement of the holder and the amount of slack twine given up to the knotter.

The construction of my improved cord-holder being as above described, the general operation needs but little further explanation.

On reference to Figs. 1 to 4 it will be seen that the cam-groove $g$ is concentric with the axis of the wheel $d$ for about half its circumference. The wheel revolves in the direction of the arrow, and the part of the cam having the greatest eccentricity is opposite the gear-segment by means of which the knotter is operated. The active part of the cam begins at the point $n'$, which is so located with respect to the gear-segment $e$ that it begins to act on the roller $r$ shortly after the beginning of the knotter's rotation. The first action of the cam-groove $g$ is to permit the holder-frame to swing toward the knotter in response to the strain on the cord until it brings up against the stop $m$. This occurs just about the time when the loop is completely formed on the knotter-jaws, as shown in Fig. 3, and the further rotation of the cam-groove then forces down the roller $r$ and projects the plunger $q$, so as to cause the latch to give the disk a partial rotation. This movement of the disk grips the needle-strand of the cord, (which has been laid in the notch $d'$ by the advance of the needle, as indicated in Figs. 2 and 3,) and before the rotation entirely ceases both strands have been carried against the knife $c'$ by the movement of the disk and the cords have been severed, leaving a short piece or fag end $o'$, Fig. 5, in the holder-disk. The continued rotation of the cam-groove then retracts the plunger and pushes the holder-frame outward again until the flat top $p'$ contacts with the overhanging edge $q'$ of the knotter-frame, when the parts are all restored to their initial position, when the whole knotting mechanism comes momentarily at rest, awaiting the formation of the next bundle.

Having thus described my invention, what I claim, and desire to secure by Letters Patent, is—

1. In a knotter mechanism for grain-binders, the combination with the knotter-frame and knotter-operating wheel, of a swinging cord-holder frame pivoted to the knotter-frame, a holder-disk carried by the swinging frame, a plunger for operating the disk also wholly carried by the swinging frame, and a single cam on the knotter-operating wheel for controlling the holder-frame and operating the disk-plunger.

2. In a knotter mechanism for grain-binders, the combination with the knotter-frame and knotter-operating wheel, of a swinging cord-holder frame pivoted to the knotter-frame and having a holder-disk at its lower end, a sliding plunger in the frame for operating the disk having a roller projecting laterally from its upper end, and a cam on the knotter-operating wheel which engages the roller, first causing the holder-frame to swing inwardly, and subsequently operating the plunger to rotate the holder-disk.

3. In a knotter mechanism for grain-binders, the combination with the knotter-frame and knotter-operating wheel having a cam-groove in its side face, of a cord-holder comprising a bell-crank-shaped frame pivoted by one of its arms to the knotter-frame, a holder-disk journaled at the end of the other arm of the frame, and a disk-operating plunger sliding longitudinally in said disk-carrying arm and having a roller projecting laterally into the said groove of the knotter-operating wheel from the frame at the angle between the arms.

4. A cord-holder for grain-binders, comprising a bell-crank-shaped frame $k$ having two arms, a pivot for the frame at the end of one arm, a holder-disk journaled at the lower end of the other arm, a disk-operating plunger $q$ sliding in the holder-carrying arm, and an operating-roller $r$ projecting laterally beyond the frame from the upper end of the plunger.

5. A cord-holder for grain-binders comprising a swinging frame, a holder-disk journaled at the lower end of the frame, a disk-operating plunger sliding in the frame, and a yielding pawl carried by the lower end of the plunger and engaging the disk.

6. A cord-holder for grain-binders comprising a swinging frame, a holder-disk journaled at the lower end of the frame, a disk-operating plunger $q$ sliding in the frame, a pawl $x$ pivoted at the lower end of the plunger and engaging the disk, and a spring $a'$ reacting between the plunger and the pawl and operating to hold the pawl up to the disk on the forward stroke of the plunger and allow it to yield and pass the disk on the plunger's return stroke.

7. A cord-holder for grain-binders comprising a swinging frame, a holder-disk journaled at the lower end of the frame, and a disk-operating plunger $q$ sliding in the frame, and having a yielding pawl at one end for operating the disk, a roller $r$ projecting laterally from the upper end of the plunger by which it is operated, a pin $u$ projecting from the same end of the plunger, and a guide-slot $t$ in the holder-frame in which the pin slides.

8. A cord-holder for grain-binders comprising a frame $k$, having an arm $p$ projecting from its lower end at one side, a holder-disk journaled in said arm, and a plate-like cleaner $h'$ for the disk, secured to an extension $j'$ of the arm and its end projecting in the opposite direction to the rotation of the disk into close proximity to the disk's axis so as to strip the fag ends of the cord as the disk revolves.

9. A cord-holder for grain-binders comprising a frame $k$, having an arm $p$ projecting from its lower end at one side and having a cord-receiving notch at $d'$, a holder-disk journaled on a pin set transversely in the arm, a knife $c'$ secured to the opposite side of the frame from the arm and bearing against the disk, a spring $e'$ secured to the frame and coöperating with the disk to hold the cord, and a plate $h'$ secured to the extension $j'$ of the arm $p$ of the frame and projecting into close proximity to the axis of the disk so as to act as a cleaner and strip the fag ends of the cord from the disk.

10. A cord-holder for grain-binders comprising a pair of notched disks, an arm $p$ of the holder-frame in which the disks are journaled, a coöperating spring $e'$ secured to the holder-frame and having a plate $g'$ projecting edgewise between the disks, a knife $c'$ secured to the holder-frame and bearing against the outer side of the disk farthest from the arm $p$, and a plate $h'$ secured to the extension $j'$ of the arm $p$ and projecting into close proximity to the axis of the disks on the outer side of the disk nearest the arm so as to strip the fag ends of the cord as the disk revolves.

11. A cord-holder for grain-binders comprising a notched disk journaled in one end of the holder-frame, a plunger $g$ sliding in the frame, a pawl $x$ pivoted at the end of the plunger, and having a shoulder at its end to engage the notches of the disk, and a spring $a'$ reacting between the plunger and the pawl to cause the shoulder to engage the notches of the disk on the forward stroke of the plunger and permit it to yield and pass the notches on the return stroke of said plunger.

12. In a knotting mechanism for grain-binders, the combination with the knotter-frame, of a swinging cord-holder, and an adjustable stop for limiting the inward swing of the holder toward the knotter.

In testimony whereof I affix my signature in presence of two witnesses.

EDWARD A. JOHNSTON.

Witnesses:
CHAS. N. CHAMBERS,
W. M. TWOMBLY.